(12) United States Patent
Hanumanthu et al.

(10) Patent No.: US 8,668,960 B1
(45) Date of Patent: Mar. 11, 2014

(54) FLOW COATING APPARATUS AND METHOD OF COATING

(71) Applicant: Enki Technology, Inc., San Jose, CA (US)

(72) Inventors: Ramasubrahmaniam Hanumanthu, San Jose, CA (US); Patrick Neyman, San Jose, CA (US); Niles MacDonald, San Jose, CA (US); Brenor Brophy, San Jose, CA (US); Kevin Kopczynski, Woodside, CA (US); Vinod Nair, San Jose, CA (US)

(73) Assignee: Enki Technology, Inc., San Jose, CA (US)

( * ) Notice: Subject to any disclaimer, the term of this patent is extended or adjusted under 35 U.S.C. 154(b) by 0 days.

(21) Appl. No.: 13/835,253

(22) Filed: Mar. 15, 2013

Related U.S. Application Data (60) Provisional application No. 61/762,603, filed on Feb. 8, 2013.

(51) Int. Cl.
*B05D 1/30* (2006.01)
(52) U.S. Cl.
USPC ..................................... 427/420; 118/DIG. 4
(58) Field of Classification Search
USPC ...................... 427/356, 420; 118/DIG. 4, 407
See application file for complete search history.

(56) References Cited

U.S. PATENT DOCUMENTS

| | | | |
|---|---|---|---|
| 3,632,374 A * | 1/1972 | Greiller .......................... | 430/538 |
| 4,049,506 A | 9/1977 | Gilding | |
| 4,319,983 A | 3/1982 | Yoo | |
| 4,687,707 A | 8/1987 | Matsuo et al. | |
| 4,857,613 A | 8/1989 | Zolk et al. | |
| 4,868,017 A * | 9/1989 | Hammon et al. ............. | 427/356 |
| 5,044,305 A * | 9/1991 | Shibata et al. .................. | 118/73 |
| 5,641,544 A * | 6/1997 | Melancon et al. ............ | 427/331 |
| 5,688,324 A * | 11/1997 | Umaba .......................... | 118/401 |
| 5,700,300 A * | 12/1997 | Jensen et al. .................. | 29/623.5 |
| 5,849,363 A * | 12/1998 | Yapel et al. .................... | 427/420 |
| 5,851,674 A | 12/1998 | Pellerite et al. | |
| 6,054,601 A | 4/2000 | Standke et al. | |
| 6,103,313 A * | 8/2000 | Clarke et al. .................. | 427/420 |
| 6,146,690 A * | 11/2000 | Kustermann ...................... | 427/8 |

(Continued)

FOREIGN PATENT DOCUMENTS

| | | |
|---|---|---|
| JP | 2-264074 A | 10/1990 |
| JP | 4-085380 A | 3/1992 |

(Continued)

*Primary Examiner* — Michael Cleveland
*Assistant Examiner* — Tabatha Penny
(74) *Attorney, Agent, or Firm* — GTC Law Group LLP & Affiliates (57) ABSTRACT

Disclosed is a flow coating apparatus, comprising a slot that can dispense a coating material in an approximately uniform manner along a distribution blade that increases uniformity by means of surface tension and transfers the uniform flow of coating material onto an inclined substrate such as for example glass, solar panels, windows or part of an electronic display. Also disclosed is a method of flow coating a substrate using the apparatus such that the substrate is positioned correctly relative to the distribution blade, a pre-wetting step is completed where both the blade and substrate are completed wetted with a pre-wet solution prior to dispensing of the coating material onto the distribution blade from the slot and hence onto the substrate. Thereafter the substrate is removed from the distribution blade and allowed to dry, thereby forming a coating.

7 Claims, 6 Drawing Sheets

(56) References Cited

U.S. PATENT DOCUMENTS

| | | |
|---|---|---|
| 6,277,485 B1 | 8/2001 | Invie et al. |
| 6,472,073 B1 | 10/2002 | Singh et al. |
| 6,692,832 B2 | 2/2004 | Murphy |
| 6,902,767 B2 | 6/2005 | Kelsoe |
| 6,984,453 B2 * | 1/2006 | Sugimoto et al. ............ 428/469 |
| 6,997,018 B2 | 2/2006 | Sakoske et al. |
| 7,128,778 B2 | 10/2006 | Thompson |
| 7,241,505 B2 | 7/2007 | Glaubitt et al. |
| 7,345,351 B2 | 3/2008 | Moon et al. |
| 7,351,449 B2 | 4/2008 | Hunt et al. |
| 2006/0286813 A1 | 12/2006 | Meredith et al. |
| 2006/0292345 A1 | 12/2006 | Dave et al. |
| 2007/0148435 A1 | 6/2007 | Meredith et al. |
| 2007/0184247 A1 | 8/2007 | Simpson et al. |
| 2007/0264437 A1 | 11/2007 | Zimmermann et al. |
| 2008/0113188 A1 | 5/2008 | Shah et al. |
| 2008/0248312 A1 | 10/2008 | Thies et al. |
| 2009/0029145 A1 | 1/2009 | Thies et al. |
| 2009/0191346 A1 | 7/2009 | Thies et al. |
| 2010/0221557 A1 | 9/2010 | Higuchi et al. |
| 2010/0275815 A1 | 11/2010 | Dave |
| 2011/0003130 A1 | 1/2011 | Marchet et al. |
| 2011/0151146 A1 | 6/2011 | Okano et al. |

FOREIGN PATENT DOCUMENTS

| | | |
|---|---|---|
| WO | WO 97/43224 | 11/1997 |
| WO | WO 2004/051755 | 6/2004 |
| WO | WO 2005/044554 | 5/2005 |

* cited by examiner

FLOW COATING APPARATUS AND METHOD OF COATING

CROSS-REFERENCE TO RELATED APPLICATIONS

This application claims the benefit of provisional Application No. 61/762,603, filed Feb. 8, 2013. The entirety of the foregoing application is incorporated by reference herein.

STATEMENT REGARDING FEDERALLY SPONSORED RESEARCH OR DEVELOPMENT

This invention was made with government support under Contract DE-EE0006040 awarded by the U.S. Department of Energy. The government has certain rights in the invention.

BACKGROUND OF THE INVENTION

1. Field of the Invention

The present invention relates generally to the field of thin-film sol-gel coatings and in particular to coating on flat substrates such as glass or solar panels.

2. Description of Related Art

Thin-film sol-gel coating refers to a technique of coating substrates using a wet chemical formulation called a 'sol' that undergoes a 'gelation' process wherein it polymerizes to form a solid thin-film on a substrate. It is a very versatile process that has many industrial uses such as formation of dielectric layers on semiconductor wafers and water repellent layers on ceramics. There are several well documented techniques for applying wet sol to substrates, some of which are in widespread industry use and others that have generally been limited to the laboratory. Industrial scale sol-gel coating is most commonly performed by a dip, spray, spin, meniscus, or roller process.

In the dip coating process a substrate to be coated is dipped into a tank containing the sol. It is then withdrawn at a process dependent speed. As the substrate is slowly drawn from the sol, the gelation process occurs just above the surface and a thin-film layer forms. The major limitations with the dip coating process are first the fact that it is inherently two sided, that all sides and edges of the substrate are coated. This can be advantageous in some cases but is disadvantageous if the coating on some portion of the substrate interferes with a downstream process step. Second, it requires a tank slightly larger than the substrate. For large substrates this means the tank must hold a significant volume of sol. It is not unusual for sol to be mainly composed of an organic solvent, so large quantities pose a vapor and flammability hazard. Third, it can be challenging to control the composition and quality of the sol within the tank. Each new substrate dipped in the tank may carry contamination that is transferred to the sol; the sol might become depleted in some element as more substrates are processed, causing a variation in the thin-film produced, and the sol may change through evaporation of solvent at the surface where substrates are introduced.

Spray coating exists in many forms, but generally may be considered to be the deposition of material through a nozzle under pressure or the atomization of material which is then entrained by a jet of air. In all cases the material is moved across an airspace gap between a nozzle and a surface to be coated. The purpose of the spray system is to deposit an approximately uniform layer of material over a wide area of the substrate. In the context of sol-gel coatings on substrates spray coating has the advantage of only applying fresh material to the substrate. However, spray coating has some major limitations. First, generally a large amount of material has to be sprayed to get uniform coverage over a large area. Second, solvent within the sol may evaporate during the travel time from the nozzle to the substrate—changing the concentration of the sol deposited. Typically this limits the kinds of solvents that can be used to those with lower volatility. Third, spraying requires that either the nozzle or the substrate be moved in order to coat an area—for example the substrate may be moved past a line of stationary nozzles—which increases the complexity of the overall system. It has also been generally reported that it is difficult to achieve completely uniform coatings with this method.

Spin coating is commonly used in the semiconductor wafer processing industry and in the LCD display panel industry to apply even layers of material to the surface of flat substrates such as silicon wafers or large pieces of glass. It has the same advantage as spray coating in that only fresh material is deposited. It also has excellent uniformity control. However, equipment to perform the spin coating is necessarily complex and costly to maintain because of the fine mechanical control needed to achieve that uniformity. This is particularly true as the size of the substrate increases.

Meniscus coating was used during the early 1990's in the semiconductor industry before giving way to spin coating. It remains in use by some equipment vendors in the LCD display industry. Meniscus coating works by passing a substrate to be coated over a narrow slot at a very close distance such that material forced up through the slot forms a meniscus with the substrate. As the substrate moves across the slot this meniscus deposits a layer of material on the substrate. The technique requires fine control over the distance between the slot and the substrate across the full length of the slot. Generally the substrate must be extremely flat to avoid deviation in this distance. Additionally this technique works best with more viscous materials that can form a larger meniscus which limits it usability with sol-gel formulations that use non-viscous solvents.

Roll coating is in common usage for sol-gel coatings on flat substrates. In this process material is deposited from a reservoir onto a feed roller. A doctor blade may be used to control the thickness of material on the roller. That material is then transferred to a coating roller that is in contact with the substrate. In general roll coating works best with continuous substrates, such as for example a roll of steel. In the case of discontinuous substrates such as pieces of glass for example it is possible to get variation at the starting edge of the piece as coating roller reaches equilibrium. This is to say the first one or two revolutions of the coating roller on the substrate may deposit a slightly different thickness compared to subsequent revolutions. Additionally, the surface of the roller is often a compliant material that serves to compensate for any surface or flatness imperfections on the substrate and to provide a surface to which the coating material will adhere in a reasonably uniform manner. Unfortunately chemical compatibility between this surface material and the sol-gel formulation can limit versatility of this coating method.

Given the various limitations of the current coating methods for sol-gel coating of flat substrates there is clearly a need for an industrial scale method that might have many of the following attributes. The ability to selectively coat just one face of a substrate, that only deposits fresh coating material, that does not require compositional or contamination control of large tanks of material, that is economical with material deposition, that is versatile with respect to the sol-gel formulation such that solvents of different volatilities can be used and chemical compatibilities with critical equipment are relaxed, that is of low complexity and cost, that can handle large imperfections in substrate surface flatness, and that can achieve superior coating uniformity.

DETAILED DESCRIPTION OF THE INVENTION

The present invention is more fully described below with reference to the accompanying drawings. While the invention will be described in conjunction with particular embodiments, it should be understood that the invention can be applied to a wide variety of applications, and it is intended to cover alternatives, modifications, and equivalents within the spirit and scope of the invention. Accordingly, the following description is exemplary in that several embodiments are described (e.g., by use of the terms "preferably," "for example," or "in one embodiment"), but this description should not be viewed as limiting or as setting forth the only embodiments of the invention, as the invention encompasses other embodiments not specifically recited in this description. Further, the use of the terms "invention," "present invention," "embodiment," and similar terms throughout this description are used broadly and are not intended to mean that the invention requires, or is limited to, any particular aspect being described or that such description is the only manner in which the invention may be made or used.

Figure 1:
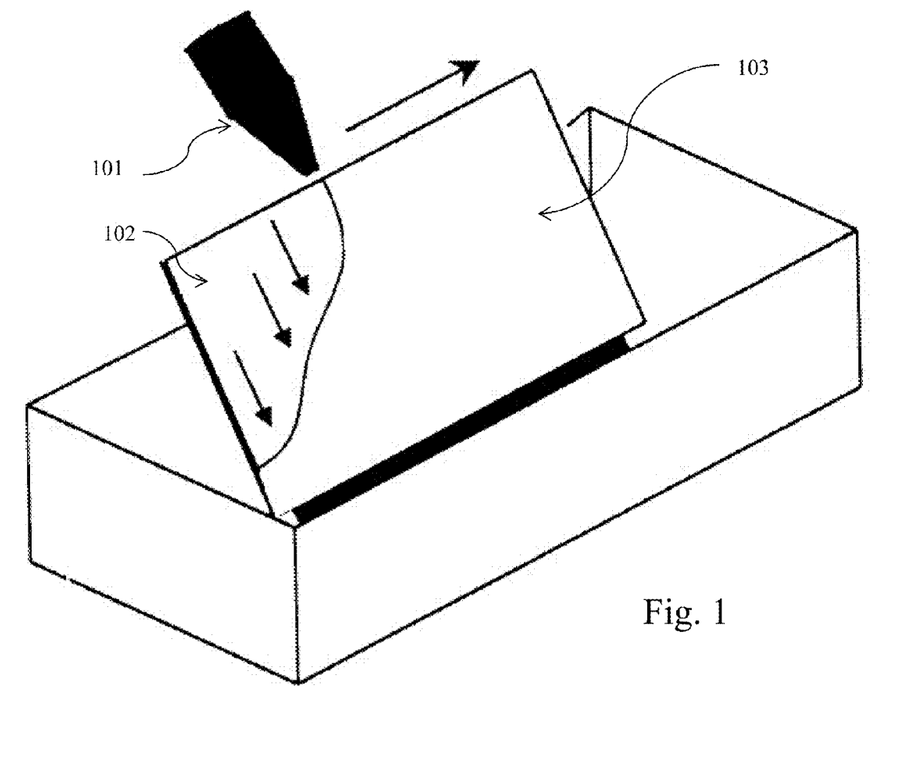
FIG. 1 shows the basic concept of flow coating.

FIG. 1 shows how the laboratory scale flow coating works. A nozzle (101) dispenses a material (102) onto an inclined substrate (103) as it is moved across the top edge of the substrate. The material flows down the substrate, and the excess drips from the bottom edge of the substrate. The material that remains adhered to the substrate undergoes the gelation process as it dries and forms a thin-film coating on the substrate.

While the basic laboratory system shown in FIG. 1 can be scaled up in substrate size, its rate of coating can be slow and wasteful of coating material. It is possible to recover the coating material that drips off the bottom edge and recycle it to the nozzle, but this makes control of composition and contamination of the recycled material difficult. So what is needed is a flow coating system that has a fast coating rate and that is economical with coating material with minimal wastage dripping from the bottom edge, without recycling of this material.

Figure 2:
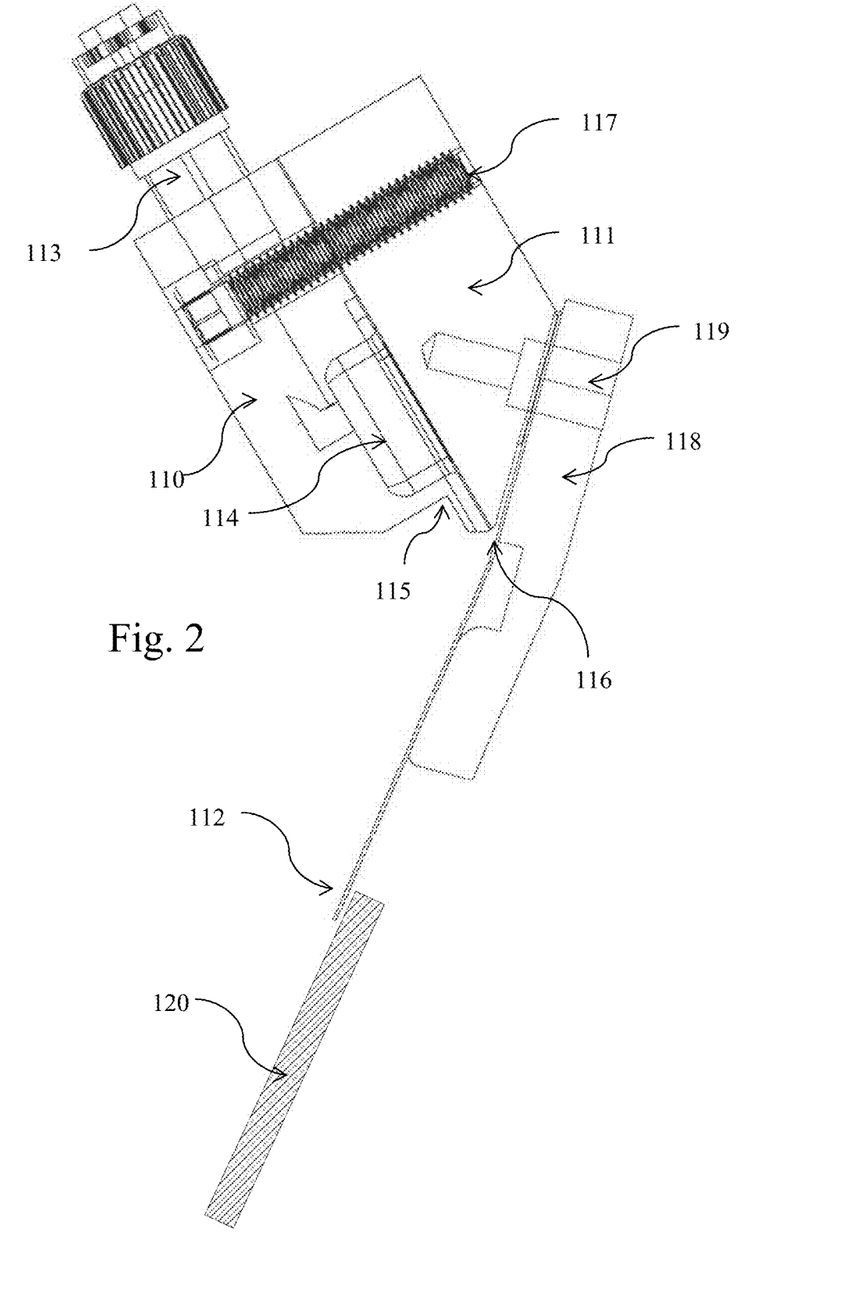
FIG. 2 shows a cross-sectional view of an embodiment of a flow coating head.
Figure 5:
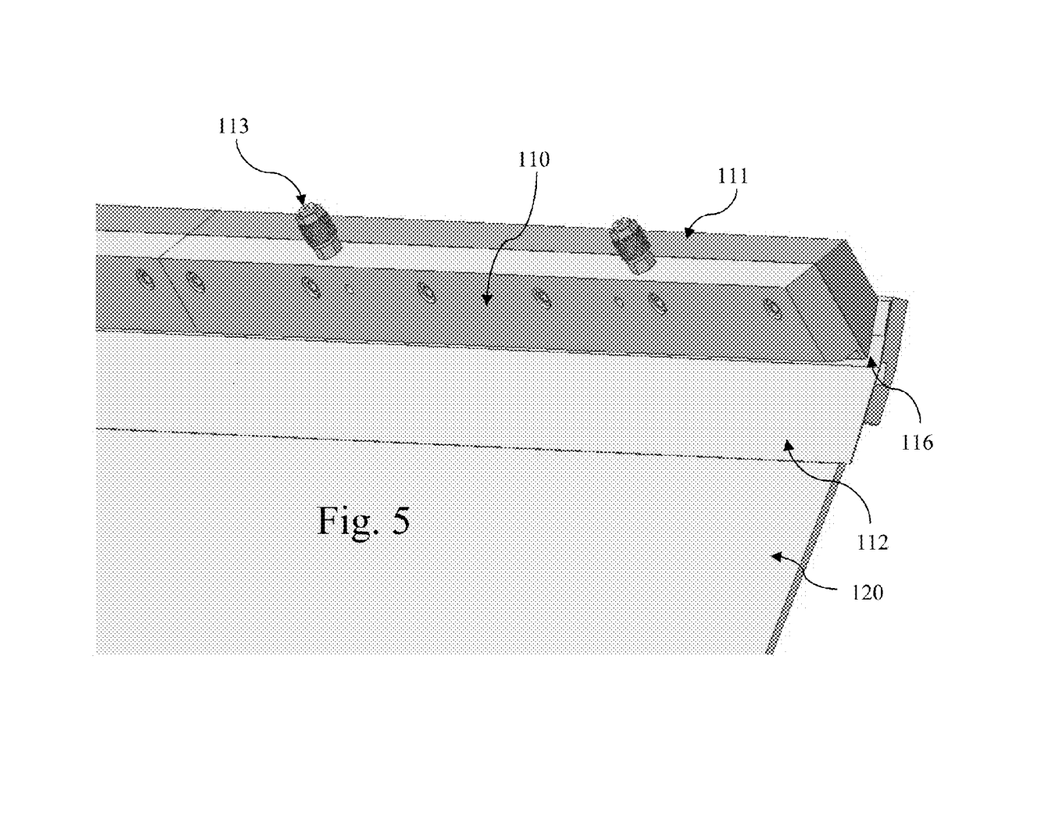
FIG. 5 shows a partial view of the assembled flow coating head of FIG. 2 and a corresponding substrate.

In one embodiment, the invention is a coating head such as the one shown in FIG. 5 and in cross-section in FIG. 2. The coating head includes a long slot (116) formed between a lower slot manifold (110) and an upper slot manifold (111). This slot is positioned parallel to and extends along the length of the top edge of an inclined substrate (120). In a preferred embodiment, this slot is approximately as long as the edge of the substrate to be coated. In a preferred embodiment, the slot is oriented along the longer edge of a rectangular substrate, such that the fluid flows down the substrate along its shorter edge. This orientation minimizes the time required for gravity to carry the fluid across the entire area of the substrate. In a preferred embodiment, a distribution blade (112) bridges the gap between the slot and the top edge of the substrate such that coating material flowing out of the slot is deposited on to the distribution blade and then flows under gravity to the bottom of the distribution blade, which contacts the front surface of the substrate just below the top edge of the substrate. The coating material then flows off the distribution blade onto the front surface of the substrate and from there down the substrate until eventually it either drips from the bottom edge or is removed by other means. The length of the distribution blade is slightly longer than the length of the slot and of the edge of the substrate that is being coated. In one embodiment the distribution blade extends 2-100 mm beyond each end of the slot manifold assemblies, and in a preferred embodiment it extends 10 mm beyond the substrate.

Figure 4:
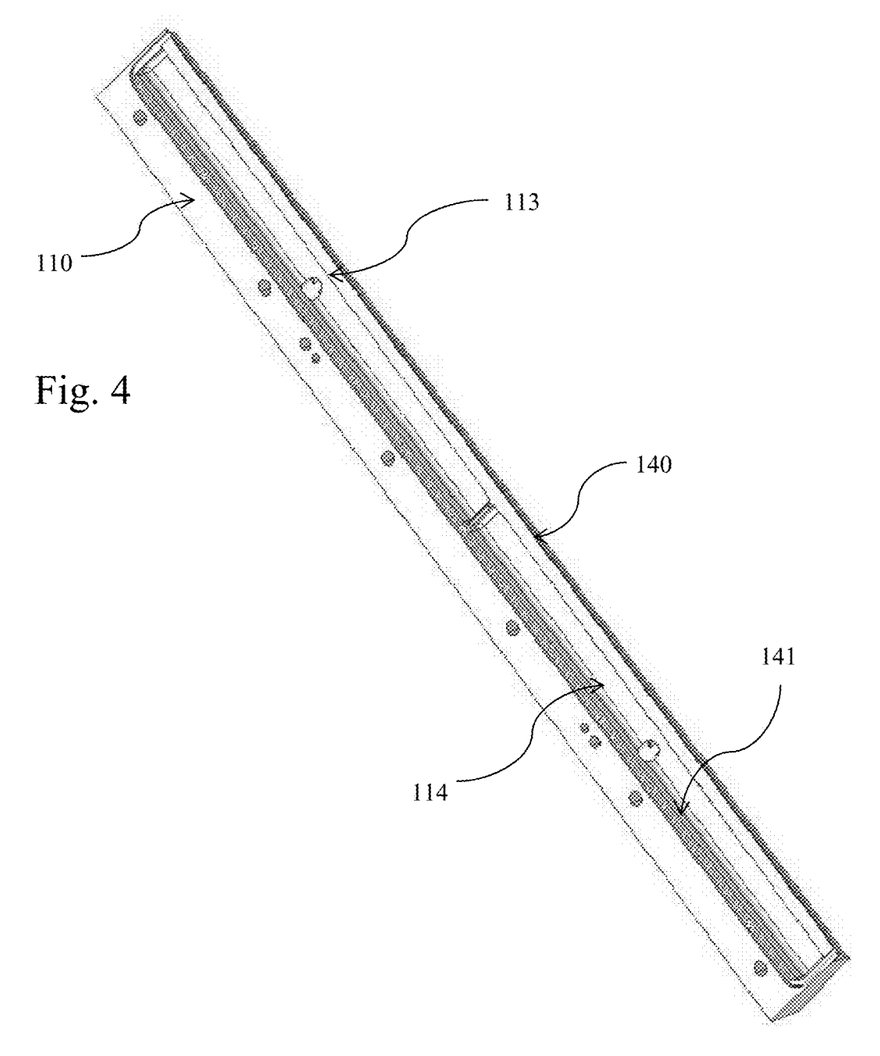
FIG. 4 shows an isometric view of a flow coating head lower slot manifold.

Coating material is supplied to the slot by a dispensing system, such as a pump (not shown) capable of transferring the liquid coating material, and that is also capable of delivering a measured quantity of coating material through one or more inlet ports (113) in the lower slot manifold. The port directs material into a corresponding internal pocket (114) within the lower slot manifold that allows the coating material to accumulate below the lip of the slot and to spread evenly along the slot before it begins to overflow the slot and flow onto the distribution blade, providing a uniform fluid front of material over the blade. FIG. 4 shows the internal detail of a lower slot manifold (110). The coating material flows from the port inlet, located in the middle of the internal pocket, outwards toward the ends of the internal pocket and so is distributed evenly along the back side of the slot lip (140). Once enough material has filled the internal pocket it will begin to overflow the slot lip evenly along the length of the slot. The upper slot manifold (not shown in FIG. 4) forms the opposing side of the slot.

The rate at which the fluid flows through the slot is critical to producing high quality coatings of uniform thickness onto the substrate. In turn, the rate at which the material flows is highly dependent upon several factors of the design including the slot length (l), width (w) (152) and height (h) (151), the viscosity ($\mu$) and density ($\rho$) of the coating material, and the pressure differential ($\Delta P$) over the width of the slot. In a preferred embodiment, the fluid flow in the slot is both laminar and has a fully developed velocity profile upon exit onto the distribution blade. Laminar flow in the slot can be achieved by ensuring the fluid has a Reynolds number less than 1,400. In a preferred embodiment, the Reynolds number (Re) of the coating fluid within the slot is less than 100. It is also desirable to have the coating fluid exit the slot with a velocity profile that is independent of subtle edge effects, turbulence and other disturbances present at the coating fluid's entry into the slot. This condition can be achieved by ensuring the width of the slot is significantly longer than the flow's characteristic entrance length ($L_e$). In a preferred embodiment the slot width is equal to at least 10 times the entrance length. Such a condition is governed in the following relation, which uses the Blasius approximation to solve for the entrance length between parallel surfaces:

$$L_e = \frac{hRe_h}{100}$$

The volumetric rate at which the coating fluid flows through the slot is closely approximated by the following relation:

$$Q = \frac{l\Delta P h^3}{12 w \mu}$$

With average flow speed, V, determined by:

$$V = \frac{Q}{lh}$$

In the preferred embodiment, sol coating flow rates per unit slot length of between $5\times10^{-9}$ and $5\times10^{-4}$ m²/s are most desirable for coating glass substrates of high quality, and uniform thickness. In an embodiment with a 2 meter long slot, this equates to a volumetric flow rate between $1\times10^{-7}$ and $1\times10^{-3}$ m³/s. To prevent splatter or turbulent flow or other undesirable phenomena from impacting the distribution blade or substrate, it is important that the coating material is not forced from the slot under high pressure or flow rates. A preferred embodiment uses primarily gravity force to drive fluid from the internal pocket to the distribution blade. In a preferred embodiment the slot is designed such that for the chosen coating material properties, the flow rate out of the slot is less than the flow rate into the internal pocket. This has the effect of building a reservoir of coating material behind the slot in the internal pocket, forcing it to spread evenly under the influence of gravity along the entire length of the slot and to build up a head height H (FIG. 6, number 150) inside the interior pocket. If the flow rate through the slot too high then coating material will completely flow through part of the slot before spreading along the entire length of the slot and reaching the ends furthest away from the inlet port. If the flow rate is too low then the internal pocket may completely fill with coating material causing an increase in pressure that will create uneven flow rates and excessive, undesirable back pressure on the coating fluid, and adversely affecting the flow rate through the slot. All of these issues can cause the slot flow rate to vary and can affect the quality and uniformity of the coating. The pressure drop over the slot width, $\Delta P$, can be related the fluid head height within the interior pocket, H (150), the interior pocket pressure $P_o$ (154), pressure at the entrance to the narrow slot, $P_1$ (153), and the pressure at the exit of the slot, $P_2$ (155), the fluid material density $\rho$ and the gravitational constant g according to the following relations:

$$\Delta P = P_1 - P_2$$

$$\Delta P = \rho g H + P_o$$

Figure 6:
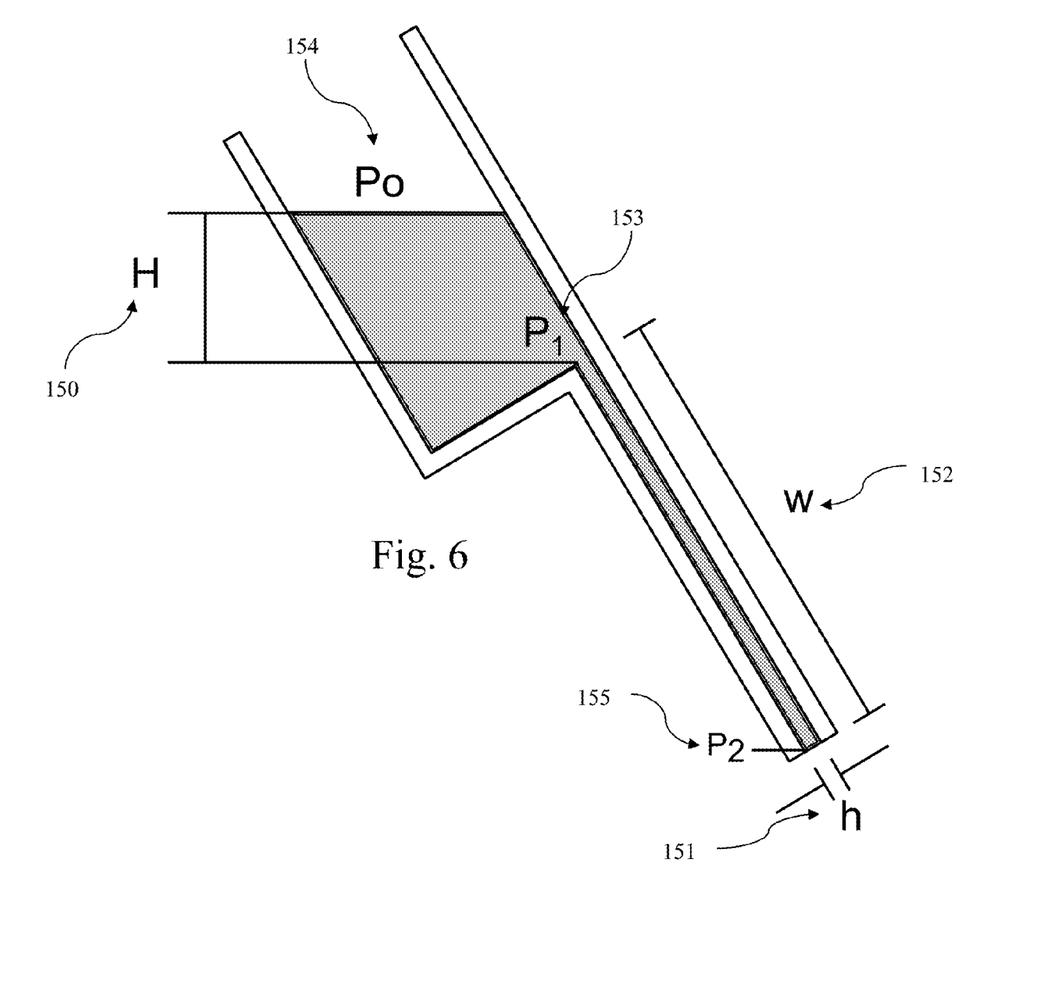
FIG. 6 shows a schematic cross-sectional view of a coating slot identifying several critical dimensions and parameters.

This pressure input as a function of head height, combined with the desired flow rate drives the desired slot height, h (151). As a result, careful consideration should be paid to the pressure in the internal pocket. Some embodiments keep the internal pocket sealed via a gasket, o-ring or sealant such that pressure is controlled by the relative flow rates of coating material into and out of the pocket. Other embodiments may include vents between the internal pocket and ambient pressure or to an auxiliary pressurization system. In the preferred embodiment, pressure inside the pocket is vented to atmosphere and slot height, h, is determined by the following relation:

$$h = \sqrt[3]{\frac{12 Q w \mu}{l \rho g H}}$$

Given the above parameters, for a typical sol coating, the width of the slot is between 0.05 and 2 mm, and preferably 0.1 to 0.5 mm. This width may be controlled by placing shims between the upper and lower slot manifolds. Alternative embodiments might use machined steps or other gap control methods. The assembly of upper and lower slot manifolds may have a gasket-like seal along the top and sides to ensure material is directed towards the slot. An O-ring or similar interior pocket seal should allow the assembly to close to the appropriate slot width, and may be facilitated with the use of a a seal channel (141).

The distribution blade of the preferred embodiment serves three critical functions in enabling consistent and uniform coating thickness; 1) it provides a path for coating material to flow from the slot to the substrate; 2) it has a high energy surface that causes the material to spread evenly by surface tension during its travel from the slot to the substrate; and 3) it provides an interface to the substrate surface that is tolerant of imperfections in flatness or warping of the substrate. In one embodiment, the distribution blade is relatively more flexible than the substrate and is able to conform to an uneven or warped substrate. For example, the distribution blade is 316L stainless steel, 2020 mm long, 45 mm wide and 0.38 mm thick and the substrate is tempered soda-lime glass 1970 mm long, 984 mm wide and 3.2 mm thick. In another embodiment the distribution blade is relatively more rigid than the substrate and a mechanism clamps a substrate to the back surface such that it is held flat against the distribution blade. For example the distribution blade is 316L stainless steel. In one embodiment the blade has a surface energy between 25 mN/m and 100 mN/m.

It is important to understand that the coating material exiting the head slot does not naturally form a continuous curtain or 'waterfall' of coating material in the absence of the distribution blade. If one were to observe the slot in operation without the distribution blade, it would be seen that the coating material exited the slot with many drips or small rivulets of material all along the length of the slot. As such, the slot would not make a consistent or uniform thickness coating on the substrate. To achieve a curtain or "waterfall" out of the slot head in the absence of the distribution blade would require significantly greater flow rates of coating material, and could therefore result in significant waste of coating material. Thus, the distribution blade can serve as an important element of the present invention that enables the consistent and uniform thickness coating with minimal material waste.

In FIG. 2 the distribution blade is a thin piece material that is held in place by a backing plate (118) that along with the distribution blade is attached to the upper slot manifold (111) by a plurality of bolts or other fastening means (119). This backing plate also serves to tension the distribution blade by forcing it forward at a slight angle. This reduces warping of the thin distribution blade along its length. The upper and lower slot manifolds are held together by a plurality of bolts or other fastening means (117). In some embodiments the bottom edge of the thin distribution blade may be beveled or rounded. In a preferred embodiment it is beveled between 15° and 60°.

In some embodiments the distribution blade is made from a stainless steel alloy such as 316L. In other embodiments it could be made from titanium, chrome or nickel plated steel, various corrosion resistant alloys, glass, ceramics, polymer or composite materials such as a metal coated polymer. In all cases the material is chosen to be chemically resistant to the composition of the coating material such that it is not damaged by the coating material and such that it does not contaminate the coating material in any way.

In FIG. 2 the lower slot manifold has a notch (115) just below the slot. The purpose of this notch is to prevent the flow of coating material from the slot along the bottom edge of the lower slot manifold and from there dripping on to the distribution blade or the substrate.

Figure 3:
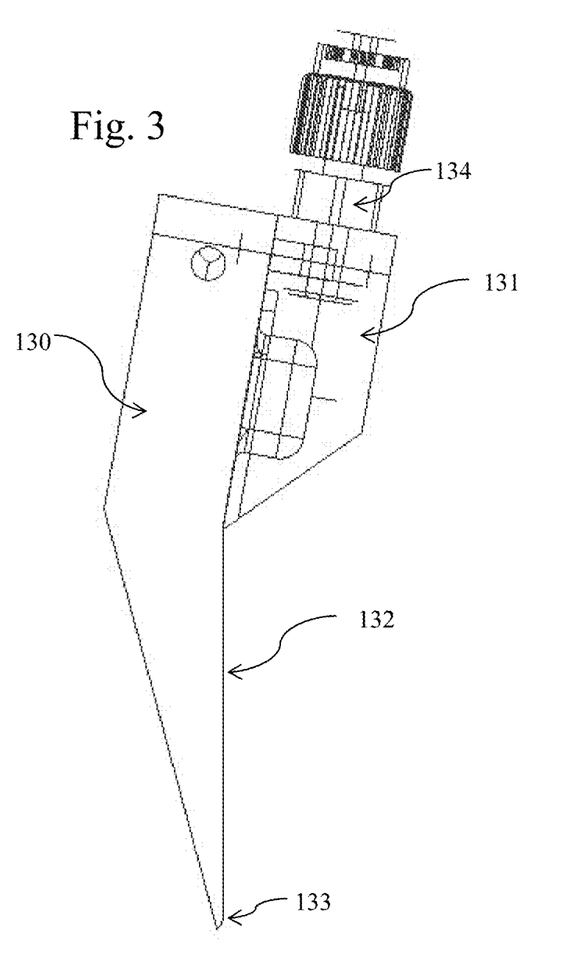
FIG. 3 shows a cross-sectional view of a second embodiment of a flow coating head.

FIG. 3 shows an alternative embodiment of a distribution blade (130) wherein the blade is a solid piece of material that also forms the upper slot manifold. The front surface of the blade (132) acts to distribute the coating material evenly from the slot to the substrate. The bottom edge of the blade is profiled (133) to facilitate the flow of coating material from the blade onto the substrate. It should be understood that the exact shape of this profile can include curved or angled flat bevels and that the transition of angle from the face of the distribution blade can range from gradual to abrupt and that the final angle that the edge makes with the substrate surface can be from 10° (sharp) to 110° degrees (obtuse). In another embodiment, the thick or solid distribution blade does not also form the upper slot manifold, but is instead is a separate piece that is bolted onto the slot manifold in a manner similar to the thin distribution blade shown in FIG. 2.

Some embodiments of the distribution blade include coatings or surface treatments on the front side (that is the wet side) and on the back side. For example a front side surface treatment may enhance the spreading of the coating material as it flows to the substrate. A back-side treatment might repel the coating material to suppress material gathering on the backside due to capillary action that then dripped onto the substrate as it was removed from the distribution or gather on the backside and contaminate the next substrate positioned against the blade. Other embodiments of the distribution blade include laminates and composites where dissimilar materials are fused or assembled together to provide differences between the front and backside surface properties as might also be achieved in the case of a coated metal blade.

Some embodiments of the coating head manifolds may have coatings or surface treatments to protect them from adverse chemical reactions with the coating material or to change how the coating material flows within the internal pocket or over the slot lip.

A full coating head may be composed of a plurality of slot manifold assemblies. For example each slot manifold assembly might be 50 cm long. Four such assemblies might be mounted on a supporting structure such that they form a 200 cm long coating head. The dimensions of the slot manifold assembly and the number of such assemblies used for a particular length of coating head is a trade-off between the cost of manufacturing the slot manifolds themselves and the complexity of constructing the coating head from multiple slot manifold assemblies. In the case where multiple slot manifold assemblies are used to assembly a coating head it is advantageous to have a single distribution blade that continuous over the entire length of the coating head. However multiple adjacent or overlapping segments of distribution blade comprising the length of the coating head are not precluded.

It should be understood that the number of internal pockets and inlet ports within a slot manifold is variable and may be more or less than the two shown in FIG. 4. The number of pockets and inlet ports is a trade-off between manufacturing complexity of the slot manifold and the uniformity of flow of coating material from the slot.

In the slot manifold, the wall between internal pockets should be kept as thin as possible. This wall affects the flow of material over the slot lip in its immediate vicinity. By keeping the wall as thin as is practical the effect is minimized.

The method of coating using the apparatus includes the following steps. First, optionally the substrate should be prepared for the coating by increasing the surface energy of the surface to be coated, thus making it possible for the coating material to spread evenly on the substrate surface by surface tension. In one embodiment the substrate is glass and the surface energy is increased simply by washing vigorously with water and/or mechanical brushes. In other embodiments the substrate surface might be prepared using gas plasma such as oxygen or might be treated with a gas flame.

Next, position the substrate to be coated with its top edge aligned with and parallel to the bottom edge of the distribution blade. The bottom edge of the distribution blade should overlap slightly with the top edge of the substrate. The amount of overlap is dependent upon the coating requirements but should be at least 0.1 mm and in a preferred embodiment be approximately 3 mm. The ends of the distribution blade should extend slightly beyond the left and right edges of the substrate, between 2 and 100 mm on each side. In a preferred embodiment, it extends by 10 mm on each side. The substrate may be inclined at an angle of 60° to 85° relative to horizontal. In the case of a flexible thin distribution blade, the angle between the surface of the substrate and the surface of the distribution blade may be between 0° and 5°. The substrate can be pushed slightly against the distribution blade to apply pressure to the contact area such that the distribution blade conforms to any gross irregularity or deviation from flatness of the substrate. In the case of a rigid distribution blade the substrate may be positioned with its front surface parallel to the back surface of the distribution blade and a clamping mechanism may hold the substrate to the distribution blade such that any warping or deviation from flatness of the substrate is eliminated against the flat back side of the distribution blade. In one embodiment the coating head is stationary and the substrate is brought to it. However in other embodiments the substrate might be stationary and the coating head moved to position or both elements might move together to arrive at the final coating position. It is also possible for both elements to be stationary relative to each other but to be moving relative to the larger coating system.

Next, the front surface of the substrate is completely wetted with a pre-wet solution. This pre-wet solution is dispensed in a manner that quickly wets the entire substrate surface in less than 30 seconds. In one embodiment a plurality of fan nozzles positioned on a rotatable mechanism above and in front of the substrate and along its length aligned to the coating head starts spraying pre-wet solution such that it first wets the distribution blade along it entire length. Then the nozzle assembly rotates such that the fan shaped jets of pre-wet solution from the nozzles travel down the substrate from its top edge to its bottom edge and in the process deposit pre-wet solution on the full surface of the distribution blade and the substrate. When employed, the pre-wet step decreases the time for the coating material to completely wet the substrate to between 1 and 25 seconds; improves the uniformity of distribution of the coating material on the substrate to ±25% by volume per unit area and reduces the amount of coating material needed to completely coat the substrate by up to 90%. The composition of the pre-wet solution is chosen to provide the following properties. The viscosity is within ±50% of the viscosity of the coating material and more preferably within ±10% and even more preferably within ±2% and/or the surface tension is within ±50% of the surface tension of the coating material and more preferably within ±10% and even more preferably within ±2% and/or the vapor pressure is within ±50% of the vapor pressure of the coating material and more preferably within ±10% and even more preferably within ±2%. In one embodiment the pre-wet solution is composed of the same mixture of solvents, mixed in the same ratios as the coating material. For example the pre-wet solution might be composed of 90% isopropyl alcohol and 10% water that approximately matches the ratio isopropyl alcohol and water in a sol-gel coating material. In an alternative embodiment the pre-wet solution could be a non-ionic, cationic or anionic surfactant, such as for example dodecyl sulfate or perfluoroalkyl sulfonate.

Next or some time shortly after the pre-wet step has commenced, a pre-determined amount of coating material is dispensed from the coating head on to the substrate. The coating material flows down the substrate completely covering the front surface of the substrate. Excess coating material may drip from the bottom edge or be wicked away from bottom edge by capillary action onto a mechanism designed for that purpose. In some embodiments excess coating material may be collected at the bottom of the substrate for reuse. The decision to reuse this material or not depends on the composition of the coating material and substrate. For example if the coating material is quite stable and does not significantly change during the time it travels down the substrate and if the substrate does not contaminate the coating material then a decision might be made to reuse excess material collected from the bottom edge.

Next, optionally, there is a pause of between 1 and 600 seconds after the dispensing of coating material has finished while excess coating material is able to drain out of the internal pocket and from the wet surface of the distribution blade onto the substrate. The length of this pause is optimized to reduce the possibility of drips from the distribution blade after the substrate is removed from the coating head. In some embodiments this pause might be long enough to allow the distribution blade and/or the top area of the substrate to dry or partially dry.

Next, the substrate is withdrawn from the coating head. If the coating head is still wet some embodiments may include a drip guard that quickly moves into place between the substrate and the bottom edge of the distribution blade. This drip guard may optionally touch the bottom edge of the blade to wick away excess material in which case the surface of the drip guard may have similar surface characteristic to the front surface of the distribution blade to encourage the coating material to easily flow off the distribution blade.

Finally, the substrate is allowed to dry in a manner that allows the coating material to undergo gelation such that a uniform high quality coating is formed on the substrate surface.

This coating method, enabled by the novel design of the coating head can have several of the following advantages over alternative coating techniques. First, by dispensing material simultaneously across the full width of the substrate the time to dispense can be greatly shortened. Second, by pre-wetting the substrate the amount of time for the coating material to flow down the substrate can be greatly shortened and the amount of coating material required to fully wet the substrate surface is greatly reduced. Third, if coating material is not collected at the bottom of the substrate for reuse then only fresh (virgin) material can be deposited on the substrate so control of coating material purity and composition can be greatly increased. Fourth, by utilizing a distribution blade in conjunction with a properly sized slot dispenser, the uniformity of flow of material on to the substrate can be greatly increased at very low cost and with a very simply system. Fifth, the technique can be very tolerant of deviation of flatness on the substrate without requiring any precision mechanical control or design. Sixth, the method does not necessarily pose any significant chemical compatibility challenges where it may be difficult to identify critical coating components with properties that are not sensitive to or contaminate the coating material. Finally, the method can be inherently single sided allowing the flexibility to coat one side of the substrate or both (in a second coating step) if needed.

Is should also be understood that in some embodiments the formulation of the coating material will have a significant effect on the uniformity of the thin-film. In particular in a sol-gel coating material the ratio of solids or particle content to solvent in conjunction with the ambient conditions during drying will significantly affect the gelation process that occurs as the thin-film forms. Careful control of these elements will enhance the uniformity of the final thin-film especially in the top to bottom direction on the substrate.

The foregoing apparatus and method are particularly well suited to the application of sol-gel thin-films to glass. In a preferred embodiment this glass is the front (Sun facing) surface of a solar panel and the sol-gel thin-film is an anti-reflective coating. Either bare glass may be coated by the apparatus or fully assembled solar panels or a solar panels at any intermediate stage of manufacture. In other embodiments the apparatus may be used to coat windows, displays or other electronic devices.

Embodiments of the present invention are well suited to performing various other steps or variations of the steps recited herein, and in a sequence other than that depicted and/or described herein.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method of coating a substrate comprising:
   cleaning or otherwise increasing the surface energy of a surface of the substrate such that a coating material will evenly wet the surface when the coating material is applied to the surface;
   positioning the substrate adjacent to a coating distribution blade;

wetting the distribution blade and the substrate with a pre-wet solution;

dispensing a coating material from a slot onto the distribution blade, wherein the coating material flows by gravity down the distribution blade onto the surface of the substrate, and wherein the coating material flows from the top to the bottom of the surface of the substrate, leaving a layer on the substrate.

2. The method of claim 1, further comprising removing the substrate from the distribution blade and allowing it to dry.

3. The method of claim 1, further comprising collecting excess coating material from the bottom of the substrate.

4. The method of claim 1, further comprising pressing the substrate against the distribution blade such that the distribution blade conforms to the substrate or the substrate conforms to the distribution blade.

5. The method of claim 1, wherein the pre-wet solution comprises a mixture of solvents chosen to provide the following properties. The viscosity is within ±50% of the viscosity of the coating material and more preferably within ±10% and even more preferably within ±2% and/or the surface tension is within ±50% of the surface tension of the coating material and more preferably within ±10% and even more preferably within ±2% and/or the vapor pressure is within ±50% of the vapor pressure of the coating material and more preferably within ±10% and even more preferably within ±2%.

6. The method of claim 1, wherein the distribution blade and/or substrate are allowed to dry or partially dry before the substrate is removed from the distribution blade.

7. The method of claim 1, further comprising placing a drip guard is placed between the substrate and the distribution blade after the substrate is removed from the distribution blade.

* * * * *

UNITED STATES PATENT AND TRADEMARK OFFICE
CERTIFICATE OF CORRECTION

PATENT NO. : 8,668,960 B1  
APPLICATION NO. : 13/835253  
DATED : March 11, 2014  
INVENTOR(S) : Ramasubrahmaniam Hanumanthu et al.

Page 1 of 1

It is certified that error appears in the above-identified patent and that said Letters Patent is hereby corrected as shown below:

In the CLAIMS:

column 12, line 1, claim 5, replace "properties. The" with --properties: the--;

column 12, line 3, claim 5, add "," after "within ±2%";

column 12, line 6, claim 5, add "," after "within ±2%";

column 12, line 14, claim 7, delete "is placed".

Signed and Sealed this  
Eighth Day of July, 2014

Michelle K. Lee  
*Deputy Director of the United States Patent and Trademark Office*